(12) United States Patent
Pogrebinsky et al.

(10) Patent No.: US 10,757,197 B2
(45) Date of Patent: Aug. 25, 2020

(54) SELF-EXTENDING CLOUD

(71) Applicant: Microsoft Technology Licensing, LLC, Redmond, WA (US)

(72) Inventors: Vladimir Pogrebinsky, Redmond, WA (US); Sata Busayarat, Redmond, WA (US); Ryan Jones, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 14/335,773

(22) Filed: Jul. 18, 2014

(65) Prior Publication Data

US 2016/0021197 A1 Jan. 21, 2016

(51) Int. Cl.
| | |
|---|---|
| *G06F 15/16* | (2006.01) |
| *H04L 29/08* | (2006.01) |
| *H04L 12/911* | (2013.01) |
| *G06F 9/445* | (2018.01) |
| *G06F 8/61* | (2018.01) |
| *G06F 9/50* | (2006.01) |

(52) U.S. Cl.
CPC .............. *H04L 67/16* (2013.01); *G06F 8/61* (2013.01); *G06F 9/445* (2013.01); *G06F 9/5072* (2013.01); *H04L 47/70* (2013.01)

(58) Field of Classification Search
CPC . H04L 67/16; G06F 9/445; G06F 8/61; G06F 9/5072
USPC .......................... 709/226, 206, 224; 713/156
See application file for complete search history.

(56) References Cited

U.S. PATENT DOCUMENTS

| | | | | |
|---|---|---|---|---|
| 7,640,213 | B2 * | 12/2009 | Reunert | G06Q 20/10 705/39 |
| 8,984,279 | B2 * | 3/2015 | Kostiainen | H04L 9/32 713/156 |
| 2003/0093496 | A1 * | 5/2003 | O'Connor | H04L 29/06 709/217 |
| 2007/0101167 | A1 * | 5/2007 | Lindley | G06F 1/263 713/300 |
| 2007/0294364 | A1 * | 12/2007 | Mohindra | G06F 8/61 709/217 |
| 2012/0047239 | A1 | 2/2012 | Donahue et al. | |
| 2012/0158821 | A1 | 6/2012 | Barros | |

(Continued)

FOREIGN PATENT DOCUMENTS

| | | |
|---|---|---|
| CN | 102571727 A | 7/2012 |
| WO | 2011116060 A1 | 9/2011 |
| WO | 2014088542 A1 | 6/2014 |

OTHER PUBLICATIONS

European Paten Office, "International Search Report," PCT Application No. PCT/US2015/040238, dated Sep. 7, 2015, 13 Pages.

(Continued)

*Primary Examiner* — David R Lazaro
*Assistant Examiner* — Mariegeorges A Henry
(74) *Attorney, Agent, or Firm* — Ray Quinney & Nebeker P.C.; James Bullough

(57) ABSTRACT

Embodiments of the invention provide the capability to combine service installation and service registration in a cloud system. This process reduces the installation of a multi-tenant service into a single-step process. For example, a cloud system admin may simply install the new service and registration is accomplished automatically as part of the installation.

17 Claims, 4 Drawing Sheets

(56) References Cited

U.S. PATENT DOCUMENTS

| | | | |
|---|---|---|---|
| 2012/0266156 A1* | 10/2012 | Spivak | G06F 9/5055 |
| | | | 717/172 |
| 2013/0117444 A1* | 5/2013 | Sharma | G06Q 10/06 |
| | | | 709/224 |
| 2013/0219476 A1 | 8/2013 | Lin et al. | |
| 2013/0247136 A1 | 9/2013 | Chieu et al. | |
| 2014/0032764 A1 | 1/2014 | Akolkar et al. | |
| 2014/0082131 A1 | 3/2014 | Jagtap | |
| 2014/0095721 A1 | 4/2014 | Arwe et al. | |
| 2014/0096129 A1 | 4/2014 | Kimmet et al. | |
| 2015/0277856 A1* | 10/2015 | Payne | G06F 7/58 |
| | | | 708/255 |
| 2016/0205202 A1* | 7/2016 | Jia | G06Q 30/04 |
| | | | 705/40 |

OTHER PUBLICATIONS

"Configuring and Administering Oracle Net Listener", Published on: Aug. 18, 2013, Available at: http://docs.oracle.com/cd/E16655_01/network.121/e17610/listenercfg.htm#NETAG010.

Unruh, et al., "Deploying Your Application", Published on: Oct. 2012, Available at: https://developers.google.com/appengine/training/py101_2/lesson5.

"Testing and Deploying Your Portlets", Published on: Jul. 2, 2012, Available at: http://docs.oracle.com/cd/E14571_01/webcenter.1111/e10148/jpsdg_deploy_portlets.htm#BABEHBDE.

"Second Office Action Issued in Chinese Patent Application No. 201580038899.9", dated Sep. 4, 2019, 13 Pages.

"Office Action and Search Report Issued in Chinese Patent Application No. 201580038899.9", dated Mar. 5, 2019, 16 Pages.

"Office Action Issued in European Patent Application No. 15745640.1", dated May 9, 2019, 7 Pages.

"Third Office Action Issued in Chinese Patent Application No. 201580038899.9", dated Jan. 6, 2020, 25 Pages.

* cited by examiner

SELF-EXTENDING CLOUD

BACKGROUND

Cloud computing enables ubiquitous, on-demand network access to a shared pool of configurable computing resources that can be rapidly provisioned and released with minimal management effort or service provider interaction. The resources may include, for example, processing, servers, storage, applications, network bandwidth, and services. A typical cloud model provides on-demand self-service, broad network access, resource pooling, rapid elasticity and measured service. Cloud consumers unilaterally provision computing capabilities as needed without requiring service provider interaction. The cloud services are available over public and/or private networks and are accessed using standard mechanisms. The cloud provider's computing resources are pooled so that they can be used to serve multiple consumers by dynamically assigning and reassigning physical and virtual resources according to consumer demand (i.e., multi-tenant).

The cloud consumer generally has no control or knowledge over the location of the provided resources which may be supported by one or more distributed datacenters. The cloud services are elastically provisioned and released to allow for rapid scaling with demand. As a result, the capabilities may appear to the consumer as unlimited and available for provisioning in any quantity at any time. Cloud systems automatically control and optimize resource use by leveraging a metering capability appropriate to the type of service.

Any number of additional resources can be registered with the cloud as long as the new services conform to the standard application programming interface (API) contract used in the cloud system. However, service onboarding into a public or private cloud currently requires a manual process. For example, in order to offer new multi-tenant services in a cloud, the service must first be installed, assigned runtime, etc. Once full installed, then someone must manually register and approve service uniform resource identifiers (URIs), certificates, and other credentials. Additionally, the capabilities of the service, such as resource type, version number, etc., must be declared. These requirements are particularly inconvenient when organizations want to install new multi-tenant services in their own private cloud or in a hosted public cloud.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide the capability to combine service installation and service registration in a cloud system. This process reduces the installation of a multi-tenant service into a single-step process. For example, a cloud system admin may simply install the new service and registration is accomplished automatically as part of the installation.

Because registration is tied to the new service, updates, such as a reconfiguration, are less error prone. For example, when the credentials for a management endpoint are updated, all related resources are updated. In particular, service registration is updated to reflect the new configuration without requiring extra manual steps.

This also allows for deletion of a service as a single-step operation. The cloud system can verify if the service is being used and prevent deletion of a service if it is still in use by a tenant. After a service deletion is validated (i.e., the service is not in use), the service is removed and unregistered from the cloud in one step.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
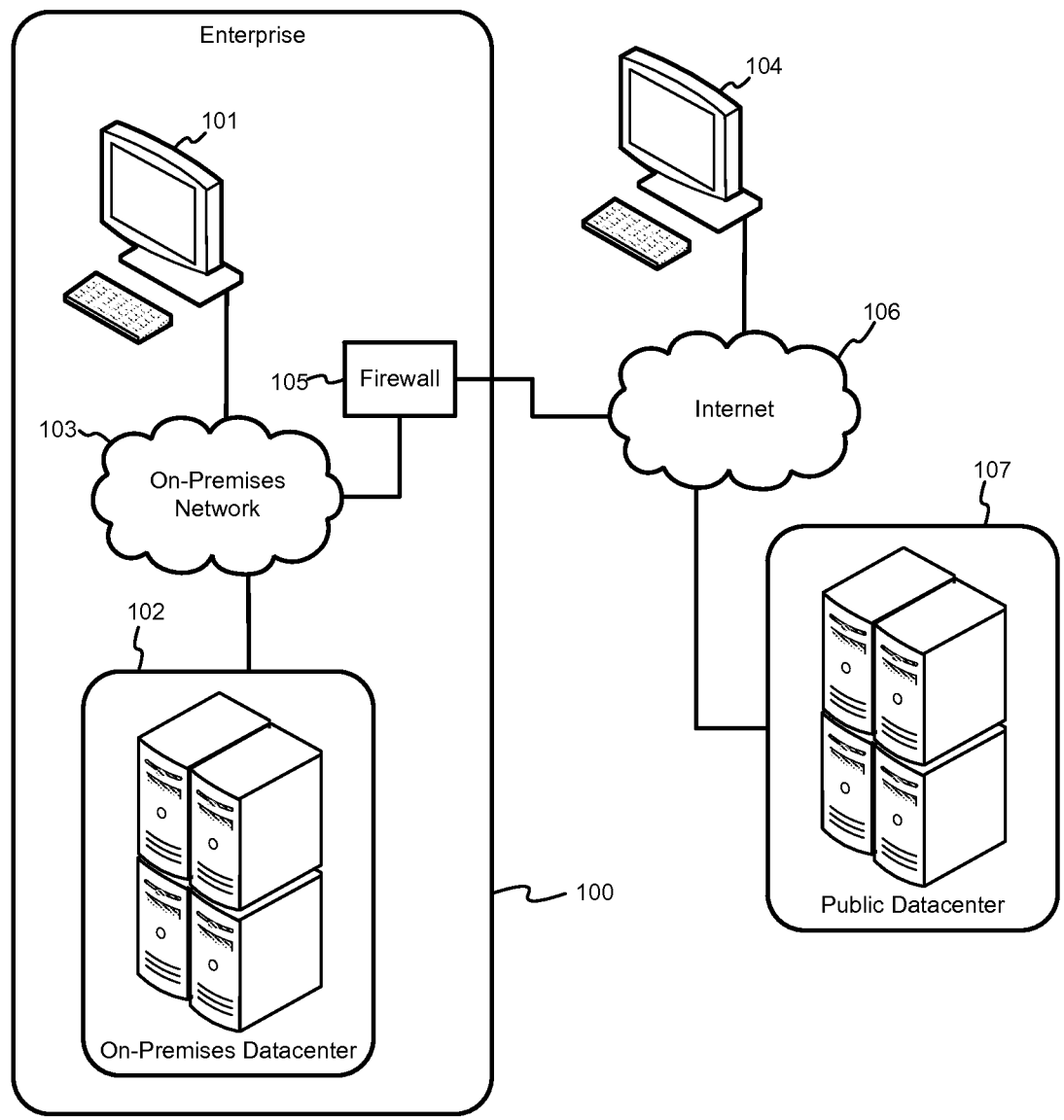
FIG. 1 is a high level block diagram of a system that provides enterprise users with access to local, on-premises resources and to remote or public resources.

FIG. 1 is a high level block diagram of a system that provides enterprise users with access to local, on-premises resources and to remote or public resources. Local enterprise terminal 101 allows users to directly access on-premises datacenter 102 via on-premises network 103. Users located outside enterprise 100 may access on-premises datacenter 102 using remote terminal 104. Terminals 101 and 104 may be, for example, a desktop, laptop, notebook, or tablet computer. Other devices, such as dedicated terminals, smartphones, personal digital assistants (PDA), etc. may also be used as terminals 101 and 104.

Firewall 105 provides network security system for enterprise 100 and controls incoming and outgoing network traffic. External terminal 104 may connect to enterprise on-premises network 103 via Internet 106 or any public or private network. Firewall 105 allows terminal 104 to access on-premises datacenter 102 if terminal 104 provides the appropriate credentials and authentication. Enterprise users at terminals 101 and 104 may also access public datacenter 107 via Internet 106.

On-premises datacenter 102 and public datacenter 107 may provide "cloud computing" services to enterprise 100 and other users. By freeing enterprise users from managing information technology (IT) infrastructure, cloud computing provides virtually limitless compute, storage, and network resources at low cost, while allowing services to scale on demand.

Figure 2:
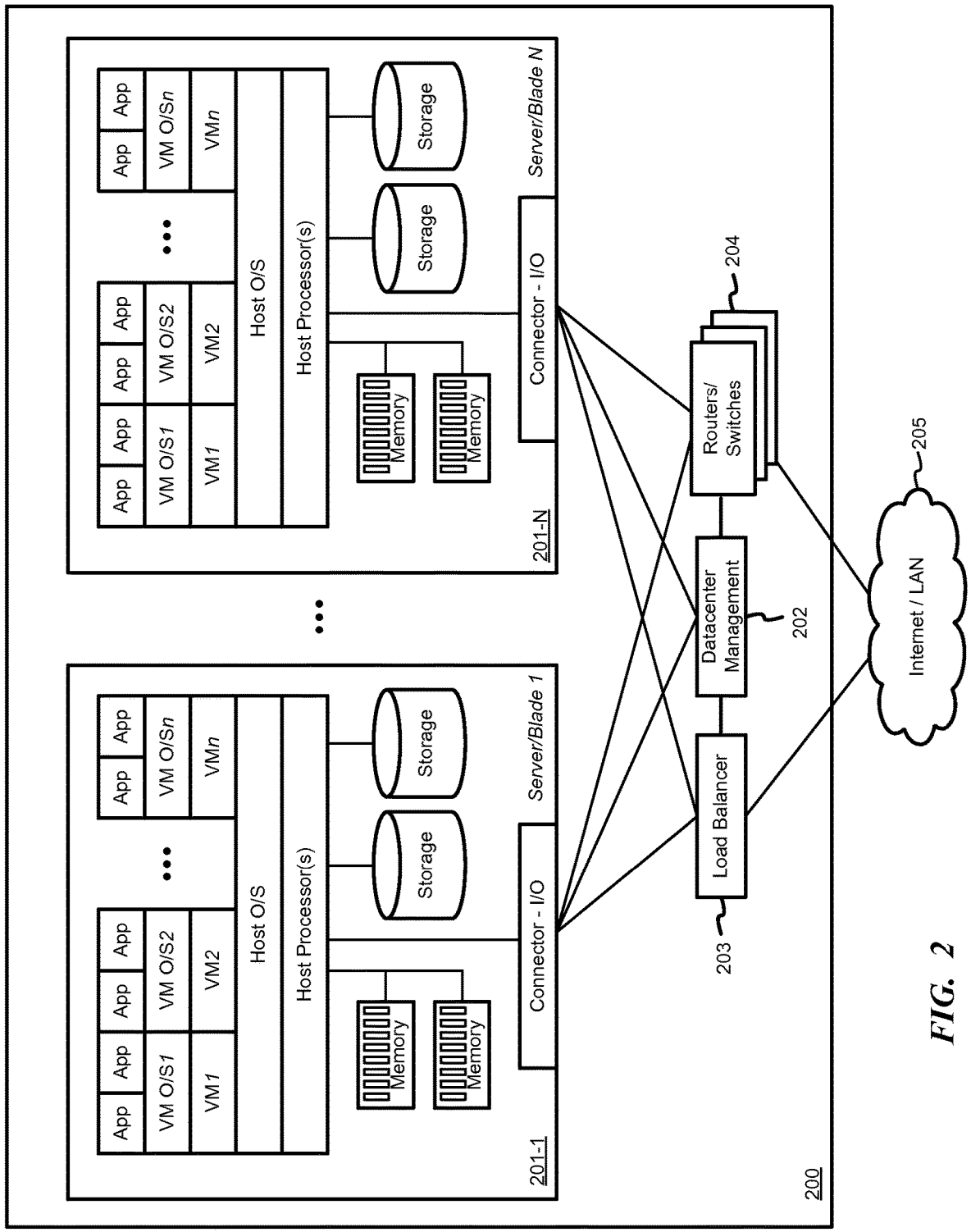
FIG. 2 is a block diagram of a datacenter that provides cloud computing services or distributed computing services according to one embodiment.

FIG. 2 is a block diagram of a datacenter 200 that provides cloud computing services or distributed computing services according to one embodiment. A plurality of servers 201 are managed by datacenter management controller 202. Load balancer 203 distributes requests and workloads over servers 201 to avoid a situation where a single server 201 becomes overwhelmed and to maximize available capacity and performance of the resources in datacenter 200. Routers/switches 204 support data traffic between servers 201 and between datacenter 200 and external resources and users via external network 205, which may be a local area network (LAN) in the case of an enterprise, on-premises datacenter 102 or the Internet in the case of a public datacenter (107).

Servers 201 may be traditional standalone computing devices and/or they may be configured as individual blades in a rack of many server devices. Servers 201 have an input/output (I/O) connector that manages communication with other database entities. One or more host processors on each server 201 run a host operating system (O/S) that supports multiple virtual machines (VM). Each VM may run its own O/S so that each VM O/S on a server is different, or the same, or a mix of both. The VM O/S's may be, for example, different versions of the same O/S (e.g., different VMs running different current and legacy versions of the Windows® operating system). In addition, or alternatively, the VM O/S's may be provided by different manufacturers (e.g., some VMs running the Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

Cloud computing is the delivery of computing capabilities as a service, making access to IT resources like compute power, networking and storage as available as water from a faucet. As with any utility, you generally only pay for what you use with cloud computing. By tapping into cloud services, you can harness the power of massive data centers without having to build, manage or maintain costly, complex IT building blocks. With the cloud, much of the complexity of IT is abstracted away, letting you focus just on the infrastructure, data and application development that really matter to your business.

Datacenter 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. A cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the datacenter may activate additional VMs on the same server and/or on a new server 201-N as needed. These additional VMs can be deactivated if demand later drops.

Datacenter 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. Database manager 202 automatically shifts incoming user requests from the primary VM to the back-up VM without requiring tenant intervention. Although datacenter 200 is illustrated as a single location, it will be understood that servers 201 may be distributed to multiple locations across the globe to provide additional redundancy and disaster recovery capabilities.

The datacenter operator may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise may use a public datacenter or public cloud computing services to take advantage of cost savings, reduced management requirements, or particular services offered. On the other hand, the enterprise may also use an on-premises datacenter or private cloud services to ensure data security or to use a proprietary application, for example. It will be understood that an enterprise does not have to use an on-premises datacenter to take advantage of private cloud services. Instead, private cloud services may be provided by a datacenter that limits access to the enterprise. The use of both public cloud services and private cloud services by an enterprise is referred to generally as a hybrid cloud.

Organizations may manage their own cloud-based services, plans, and subscriptions for the cloud. For example, an organization admin may choose to install a new multi-tenant service by selecting the service from a gallery of pre-defined services. A package, such as an Azure resource manager (ARM) package, that describes the service is downloaded from the gallery. A CSM engine unpacks a template from the package and deploys and configures the service and all necessary endpoints. At this point in existing systems, the admin would need to go to a resource provider registration user interface (UI) or API and register the freshly installed service. Embodiments of the invention improve on that experience and eliminate the traditional manual registration steps.

As described in further detail below, a subscription management service is modified to expose a special resource type that is referred to herein as a "Registration Resource Provider" resource, which looks and behaves like any other resource in the cloud. Developers of a multi-tenant service can include the Registration Resource Provider resource in the CSM template for the service and associate the service's properties (e.g., URIs, credentials, etc.) with the rest of the package. When the package is deployed by an organization's admin, it creates a Registration Resource Provider resource as part of deploying rest of the service. When the Registration Resource Provider resource is deployed into the subscription management service, it registers the newly installed service with the cloud.

The Registration Resource Provider resource registers the service administration namespace and makes service administration available to the user or organization. API call routing is enabled, and service administrative experience may be loaded into a management console.

Once a new service is registered by the Registration Resource Provider resource, the service is included into a plan that can be offered to the organization's tenants.

Additionally, the service may be included into plans that are offered for sale by the organization to tenants. The organization's plans are automatically updated to include the newly registered services, and the newly installed service becomes automatically available to the organization admin who installed the service.

Since service registration is deployed at the same time as the rest of the service application, the registration binds to the lifetime of the service. For example, when the service is deleted (i.e., when all resources comprising that the service are deleted), then the service registration is automatically deleted. Similarly, when the service is updated (e.g., when credentials are rotated, etc.), the registration resource is updated as part of normal reconfiguration.

Figure 3:
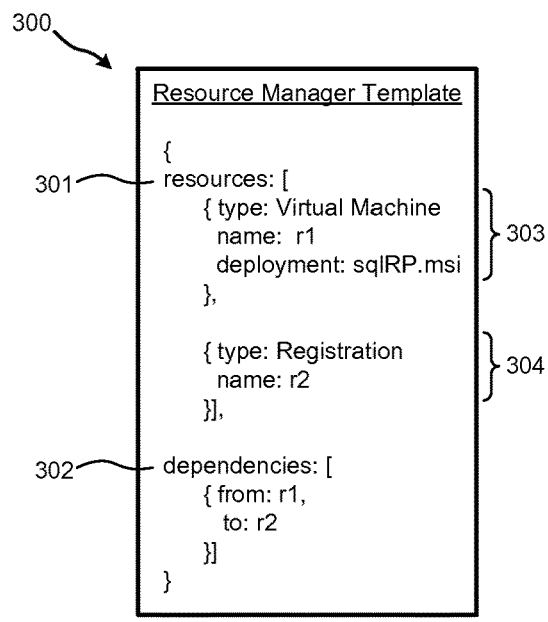
FIG. 3 illustrates a resource manager manifest or template for use with an example embodiment.

FIG. 3 illustrates a resource manager manifest or template 300 for use with an example embodiment. Template 300 may be used, for example, to add a SQL service to an organization's cloud system. Template 300 identifies the resources that are needed to establish a SQL resource provider on the cloud, including a set of resources 301 and dependencies 302. Template 300 is used by the resource manager to create and register a new resource provider as defined in the template.

In the example template 300, the resources used by the resource manager to create a new resource provider include a resource 303 of type VM and a resource 304 of type registration. Template 300 names the VM resource "r1" and deploys a SQL resource provider installation (sqlPR.msi) on that VM. Template 300 names the provider registration resource "r2." Dependency 302 defines resource r2 (provider registration) as depending on resource r1 (VM).

It will be understood that template 300 is simplified for illustration purposes and that an actual implementation may require other formatting and syntax not shown in FIG. 3. In one example, the template may be written in JSON format.

Template 300 may be provided to a resource manager, which will understand the template to direct the resource manager to create a new VM resource and create a registration for that new VM resource. For example, the registration may store a uniform resource identifier (URI) for the newly created VM resource in a registration table.

Figure 4:
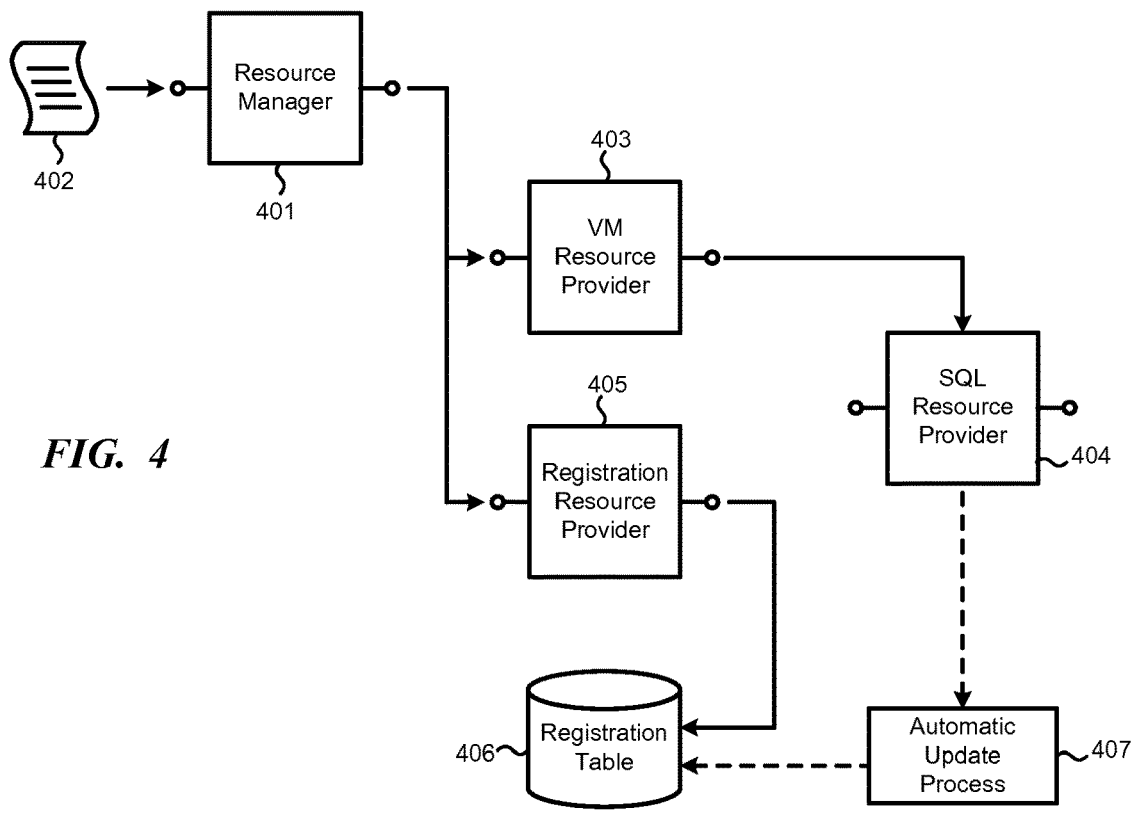
FIG. 4 is a block diagram of components of a subscription management service for adding new services to a cloud system.

FIG. 4 is a block diagram of components of a subscription management service for adding new services to a cloud system. Resource manager 401 receives a template 402 and identifies the resources and dependencies in the template. Using the example template 300 shown in FIG. 3, resource manager 401 will determine that it needs to create a VM resource (r1) and a registration resource (r2) and that registration resource depends on the VM resource. Resource manager 401 calls VM resource provider 403 and directs it to create a new VM 404 and to load the SQL resource provider installation package (sqlRP.msi) on VM 404. The output of the VM resource provider 403 to resource manager 401 is an endpoint for the new SQL resource provider 404.

Resource manager 401 then calls registration resource provider and directs it to create a registration resource 406. Because resource r2 depends on resource r1 in the template 300, the registration resource that will store a uniform resource identifier (URI) for the endpoint for the newly created SQL resource provider 404.

Once SQL resource provider 404 is created, the cloud system may now offer SQL service to its tenants. When a tenant wants to start a new SQL service, the resource manager may call SQL resource provider 404 to create a new SQL resource for that tenant. Resource manager 401 may refer to the registration table 406 to identify the current endpoint for SQL resource provider 404.

Automatic update process 407 monitors the operation of the cloud system and detects changes to the resource manifest for the resource providers 403-405. If the automatic update process 407 detects a change in the manifest for SQL resource provider 404, then it will update the associated registration in registration table 406. For example, if the endpoint URI, API, version, or resource type changes for SQL resource provider 404, then that information is updated in registration table 406. Instead of storing values in registration table, the registration may be done by reference to facilitate updating.

Figure 5:
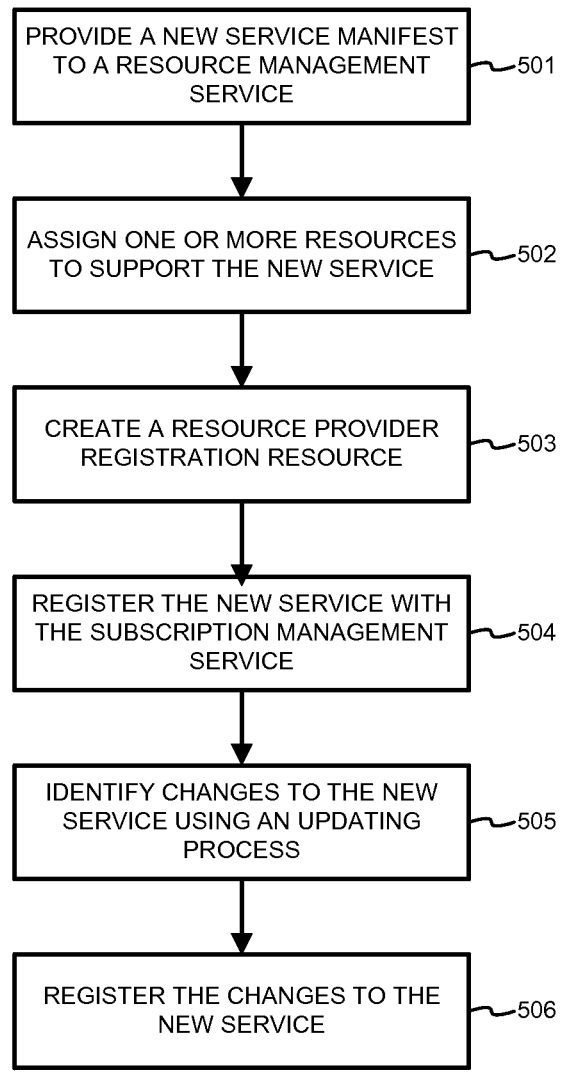
FIG. 5 is a flowchart illustrating an example embodiment of a method for installing multi-tenant services in a distributed computing or cloud system.

FIG. 5 is a flowchart illustrating an example embodiment of a method for installing multi-tenant services in a distributed computing or cloud system. In step 501, a manifest is provided to a resource management service running on the distributed computing system. The manifest is associated with a new service to be added to the distributed computing system. In step 502, based upon information in the manifest, one or more resources in the distributed computing system are assigned to support the new service.

In step 503, based upon information in the manifest, creating a registration resource by a registration resource provider. In step 504, the new service is registered with the subscription management service using the registration resource identified in the manifest. For example, an endpoint for the new service may be registered with a resource manager. The new service may be registered by reference in a registration table. Once the service is installed and registered, it may be offered to tenants of the distributed computing system.

In step 505, an updating process monitors the new service and identifies changes to the new service. In step 506, the updating the registration for the new service based on the changes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
providing a manifest to a resource management service running on a distributed computing system, wherein the manifest is associated with a new service to be added to the distributed computing system, and wherein the manifest identifies: a virtual machine (VM) resource that is capable of supporting the new service, a registration resource, and a dependency between the registration resource and the VM resource;
registering the new service provided by the VM resource with a subscription management service using the registration resource by associating a uniform resource identifier (URI) with an endpoint of the VM resource and storing the URI associated with the endpoint for the new service on a registration table;
offering the new service to tenants of the distributed computing system after the new service has been installed and registered;

detecting an updated configuration for the VM resource causing a change in the URI associated with the endpoint of the VM resource; and in response to detecting the updated configuration for the VM resource, automatically updating the registration of the new service by storing an updated URI in the registration table.

2. The computer-implemented method of claim 1, wherein the manifest identifies a registration resource provider resource.

3. The computer-implemented method of claim 1, further comprising:
creating a resource provider registration resource; and
registering the new service using the resource provider registration resource.

4. The computer-implemented method of claim 1, further comprising:
receiving the manifest at the resource manager;
calling the subscription management service to create a resource provider registration; and
creating, by the subscription management service, a resource provider registration resource for registering the new service.

5. The computer-implemented method of claim 1, wherein registering the endpoint for the new service with the resource manager further comprises:
registering a reference to the new service.

6. The computer-implemented method of claim 1, further comprising:
receiving a request to delete an installed service from the distributed computing system; and
in response to receiving the request to delete the installed service from the distributed computing system:
verifying that the installed service is not in use by a tenant;
removing a registration for the installed service from the subscription management service; and
removing components of the installed service from assigned resources.

7. The computer-implemented method of claim 1, further comprising installing the new service on the VM resource concurrent with registering the new service provided by the VM resource with the subscription management service.

8. The computer-implemented method of claim 1, wherein registering the new service comprises registering the endpoint for the new service with the resource manager such that registration of the new service is bound to a lifetime of the VM resource on the distributed computing system.

9. The computer-implemented method of claim 1, wherein the manifest comprises an object in a JavaScript Object Notation (JSON) format.

10. A computer system, comprising:
one or more processors; and
a memory coupled to the one or more processors, the memory having stored thereon computer-executable instructions that, when executed by the one or more processors, cause the computer system to:
deploy, via a resource manager service, a new service in a distributed computing system using one or more resource providers and based upon a manifest, wherein the manifest identifies: a virtual machine (VM) resource that is capable of supporting the new service, a registration resource, and a dependency between the registration resource and the VM resource;

deploy, via the resource manager service and based on the manifest, the registration resource that registers the new service;
register the new service with the subscription management service based on information in the manifest, wherein registering the new service comprises registering an endpoint of the VM resource for the new service with the resource manager service, associating a uniform resource identifier (URI) with the endpoint of the VM resource, and storing the URI associated with the endpoint for the new service on a registration resource table;
offer the new service to tenants of the distributed computing system after the new service has been installed and registered;
detect an updated configuration for the VM resource causing a change in the URI associated with the endpoint of the VM resource; and
in response to detecting the updated configuration for the VM resource, automatically updating the registration of the new server by storing an updated URI in the registration table.

11. The computer system of claim 10, wherein the computer-executable instructions, upon execution, further cause the computer system to:
receive the manifest; and
assign one or more resources in the distributed computing system to support the new service based upon information in the manifest.

12. The computer system of claim 10, wherein the computer-executable instructions, upon execution, further cause the computer system to register a reference to the new service with the resource manager service.

13. The computer system of claim 10, further comprising computer-executable instructions that, when executed by the one or more processors, causes the computer system to install the new service on the VM resource concurrent with registering the new service with the registration resource.

14. The computer system of claim 10, wherein registering the new service comprises registering the endpoint for the new service with the resource manager service such that registration of the new service is bound to a lifetime of the VM resource on the distributed computing system.

15. A memory device having program instructions stored thereon that, upon execution by a processor of a computer system, cause the computer system to:
receive, at a resource manager, a manifest for installing a new service in a distributed computing system, wherein the manifest identifies: a virtual machine (VM) resource that is capable of supporting the new service, a registration resource, and a dependency between the registration resource and the VM resource;
deploy code for the new service on resources assigned by a resource provider, the resource provider selected by the resource manager based upon the manifest;
register the new service with a subscriber management system using the registration resource selected by the resource manager based upon the manifest, wherein registering the new service comprises registering an endpoint of the VM resource for the new service with the resource manager, associating a uniform resource identifier (URI) with the endpoint of the VM resource, and storing the URI associated with the endpoint for the new service on a registration resource table; and
offer the new service to tenants of the distributed computing system after the new service has been installed and registered;

detect an updated configuration for the VM resource causing a change in the URI associated with the endpoint of the VM resource; and in response to detecting the updated configuration for the VM resource, automatically updating the registration of the new server by storing an updated URI in the registration table.

16. The memory device of claim 15, wherein to deploy code for the new service, the program instructions, upon execution by the processor, further cause the computer system to:

create a new resource provider that is configured to generate resources for providing the new service.

17. The memory device of claim 15, further comprising instructions that, when executed by the processor of the computer system, causes the computer system to install the new service on the registration resource selected by the resource provider concurrent with registering the new service with the subscriber management system.

\* \* \* \* \*